United States Patent [19]

Boldt

[11] Patent Number: 5,544,972
[45] Date of Patent: Aug. 13, 1996

[54] METHOD AND APPARATUS FOR APPLYING HORIZONTAL MARKINGS TO ROADS OR OTHER TRAFFIC AREAS

[75] Inventor: Peter C. Boldt, Müllheim, Germany

[73] Assignee: Plastiroute S.A., Geneva, Switzerland

[21] Appl. No.: 374,651

[22] PCT Filed: May 31, 1994

[86] PCT No.: PCT/EP94/01774

§ 371 Date: Jan. 17, 1995

§ 102(e) Date: Jan. 17, 1995

[87] PCT Pub. No.: WO94/29391

PCT Pub. Date: Dec. 22, 1994

[30] Foreign Application Priority Data

Jun. 10, 1993 [CH] Switzerland ............... 1 739/93

[51] Int. Cl.⁶ .................. B05D 5/00; B05D 7/24
[52] U.S. Cl. ............ 404/75; 404/94; 260/998.19; 523/172; 427/137
[58] Field of Search ............ 404/9, 12, 14, 404/93, 94, 72, 75; 260/998.19; 523/172; 106/310; 427/388.4, 136, 137

[56] References Cited

U.S. PATENT DOCUMENTS

| | | | |
|---|---|---|---|
| 4,031,048 | 6/1977 | Holmen et al. | 523/172 |
| 4,175,064 | 11/1979 | Landau et al. | 106/310 X |
| 4,690,958 | 9/1987 | Lacoste et al. | 523/172 |
| 4,839,198 | 6/1989 | Lonis et al. | 523/172 X |
| 4,856,931 | 8/1989 | Bollag | 404/93 X |

FOREIGN PATENT DOCUMENTS

| | | | |
|---|---|---|---|
| 200249 | 12/1986 | European Pat. Off. . | |
| 409459 | 1/1991 | European Pat. Off. . | |
| 2692608 | 12/1993 | France | 404/93 |
| 3133156 | 3/1983 | Germany | 404/93 |

Primary Examiner—Michael Powell Buiz
Assistant Examiner—James A. Lisehora
Attorney, Agent, or Firm—Kane, Dalsimer, Sullivan, Kurucz, Levy, Eisele and Richard LLP

[57] ABSTRACT

In the method for applying horizontal markings to road surfaces, a water-thinnable emulsion paint which is acid-coagulable is used and is brought into contact with an acid. This acid is scattered or sprayed onto or into the sprayed paint, the acid being in the form of an aqueous solution, a powder or particles wetted with acid. The method brings about drying within one or a few minutes. Using road-marking vehicles, horizontal markings can thus be put down with virtually no closing-off of the mobile operations site.

14 Claims, 6 Drawing Sheets

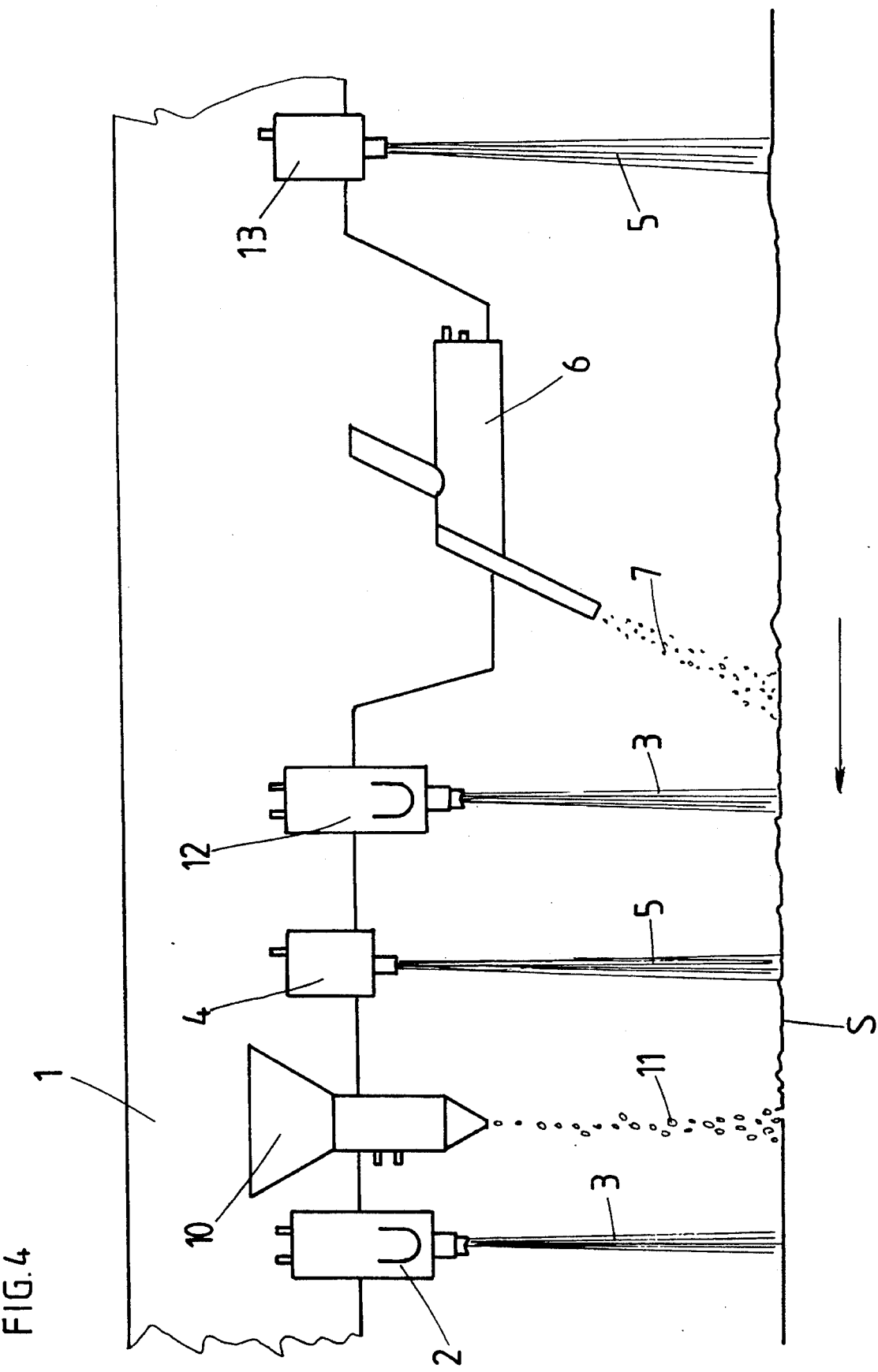

| PAINT COAT THICKNESS 1000 μ FORMULATION WITH | TEMPERA-TURE °C | REL. ATMO-SPHERIC HUMIDITY % | DRYING TIMES (MINUTES) | | | | | |
|---|---|---|---|---|---|---|---|---|
| | | | WATER CONTENT OF THE PAINT: 45% / 27% / 18% ON GLASS | | | | 18% ON ROAD COVERING | |
| | | | WITHOUT ACID | | WITH ACID | | WITH ACID | |
| | | | DRY | WATER RESIS-TANT | DRY | WATER RESIS-TANT | DRY | WATER RESIS-TANT |
| JONCRYL | 12 °C | 80% | 70/49/33 | 90/61/35 | 8/5/5 | 11/8/8 | | |
| | 22 °C | 75% | 51/36/21 | 75/43/27 | 7/5/4 | 10/7/7 | 2 | 3 |
| | 30 °C | 60% | 36/21/19 | 41/29/22 | 7/4/4 | 10/7/7 | | |
| LUHYDRAN | 12 °C | 80% | 63/45/29 | 68/46/31 | 7/5/4 | 11/9/7 | | |
| | 22 °C | 75% | 47/29/19 | 55/33/24 | 6/5/4 | 10/7/6 | 2 | 3 |
| | 30 °C | 60% | 31/20/17 | 36/22/19 | 6/5/4 | 10/7/6 | | |
| PRIMAL | 12 °C | 80% | 58/36/24 | 51/38/31 | 7/5/4 | 11/7/6 | | |
| | 22 °C | 75% | 38/23/17 | 43/38/24 | 7/6/4 | 10/6/5 | 1.5 | 2.5 |
| | 30 °C | 60% | 27/17/13 | 29/20/17 | 6/5/4 | 09/5/5 | | |

FIG. 5

| PAINT COAT THICKNESS 400 μ FORMULATION WITH | TEMPERA-TURE °C | REL. ATMO-SPHERIC HUMIDITY % | DRYING TIMES (MINUTES) | | | | | |
|---|---|---|---|---|---|---|---|---|
| | | | WATER CONTENT OF THE PAINT: 45% / 27% / 18% ON GLASS | | | | 18% ON ROAD COVERING | |
| | | | WITHOUT ACID | | WITH ACID | | WITH ACID | |
| | | | DRY | WATER RESIS-TANT | DRY | WATER RESIS-TANT | DRY | WATER RESIS-TANT |
| JONCRYL | 22 °C | 75% | 47/31/19 | 57/38/25 | 5/3/1 | 6/5/2 | 3/4 | 1.5 |
| LUHYDRAN | 22 °C | 75% | 43/23/17 | 47/28/20 | 4/2/1 | 6/4/2 | 3/4 | 1.5 |
| PRIMAL | 22 °C | 75% | 35/18/12 | 38/24/16 | 4/2/1 | 5/3/2 | 1/2 | 1.0 |

FIG. 6

METHOD AND APPARATUS FOR APPLYING HORIZONTAL MARKINGS TO ROADS OR OTHER TRAFFIC AREAS

BACKGROUND OF THE INVENTION

1. Field of the Invention

The present invention relates to a method and to an apparatus for applying horizontal markings to roads or other traffic areas, using water-thinnable emulsion paints.

2. Description of the Related Art

Horizontal markings, especially limiting, guiding and warning lines, are generally applied using a marking vehicle which is equipped with paint spray guns for spraying the marking paint and, optionally, with bead scatterers for applying reflective beads, as described, for example, in EP-B-0 280 102.

Marking paints containing solvents are known generally, but their use is being increasingly criticized for reasons of environmental protection. Also known are water-thinnable emulsion paints, which are more environmentally friendly.

A disadvantage common to both types of marking paints, however, is a fairly long drying time, of in general from 10 to 30 minutes. At a drying time of, for example 20 minutes and a marking rate of 6 km/h, therefore, it is necessary to close off a stretch of 2 km at a time behind the operations site with the aid of a blocking gang, resulting in considerable hindrances and hold-ups for traffic. Furthermore, marking work has to be interrupted in inclement weather and when rain threatens, so as to avoid the possible running of paint which has not yet become water resistant.

EP-A-0 200 249 describes a process in which an aqueous emulsion paint is caused to dry within 15 minutes—in specific cases in 6 minutes—after application, by the addition of a water-soluble salt, for example sodium chloride, calcium chloride or the like. The quantity of salt is from approximately 15 to 25 g per $m^2$ of painted surface.

EP-A-0 409 459 describes acid-coagulable emulsion paints which contain, in particular, an anionic stabilized polymer emulsion and a polyfunctional amino polymer and which are stabilized in the alkaline range by a volatile base. After application the base evaporates, so that the pH falls and, as it passes the pH of coagulation, the paint solidifies. The drying time is from 10 to 20 minutes or more, depending on the temperature and the degree of atmospheric humidity, which are factors which affect the evaporation of the base.

SUMMARY OF THE INVENTION

The aim of the present invention is to provide a method and an apparatus which together permit marking work to be carried out with shorter paint drying times, which are largely independent of the weather, and which therefore make it possible to work even in unfavourable weather conditions, irrespective of atmospheric humidity and temperature, and with virtually no closure of the road.

This object is achieved, with respect to the method, by the features specified in the characterizing clause of claim 1 and, with respect to the apparatus, by the features indicated in claim 9.

The application of the paint and of the acid is carried out by methods which are well known to the person skilled in the art, preferably by spraying.

The invention makes it possible to shorten the drying time of the paint, and with it the time before it is possible to drive—in the road-traffic sense—over the paint to only from about one to two minutes or even less, depending on the coat thickness and application method, and thus to a fraction of the drying times which were previously required.

BRIEF DESCRIPTION OF THE DRAWINGS

The invention is illustrated in more detail, with reference to the drawings, by exemplary embodiments. In the drawings FIG. 4 shows a fourth example, in which the installations illustrated in FIG. 1 on the marking vehicle are supplemented by further installations, and FIGS. 5 and 6 show tables of the results of comparative tests.

DETAILED DESCRIPTION OF THE PREFERRED EMBODIMENTS OF THE INVENTION

Figure 1:
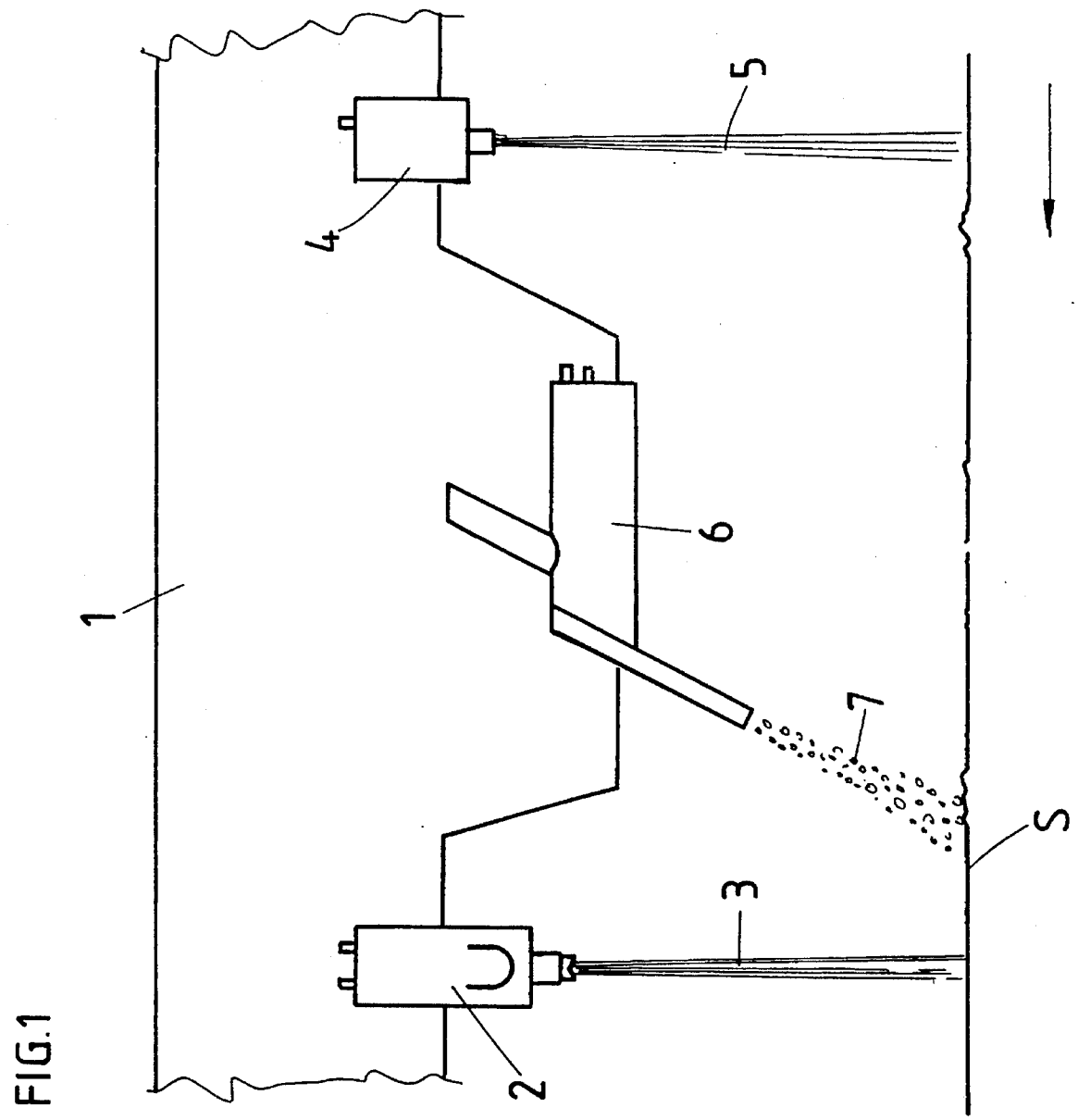
FIG. 1 shows a first example of a marking vehicle (which is only vaguely indicated) with a paint spray gun, a reflective-bead scatterer and a nozzle for spraying acid on to the marking.

According to a first embodiment of the method according to the invention, which can be carried out with a marking vehicle moving in the direction of the arrow in accordance with FIG. 1, the fresh film of paint applied is sprayed, shortly after application, with an aqueous solution of an acid. For this purpose the marking vehicle 1 carries a conventional paint spray gun 2, which sprays a jet 3 of paint on to the roadway S, followed by a bead scatterer 6, which scatters reflective beads 7 on to the fresh marking, and followed in turn by a nozzle 4 for spraying an acid 5 on to the freshly sprayed paint marking.

Figure 2:
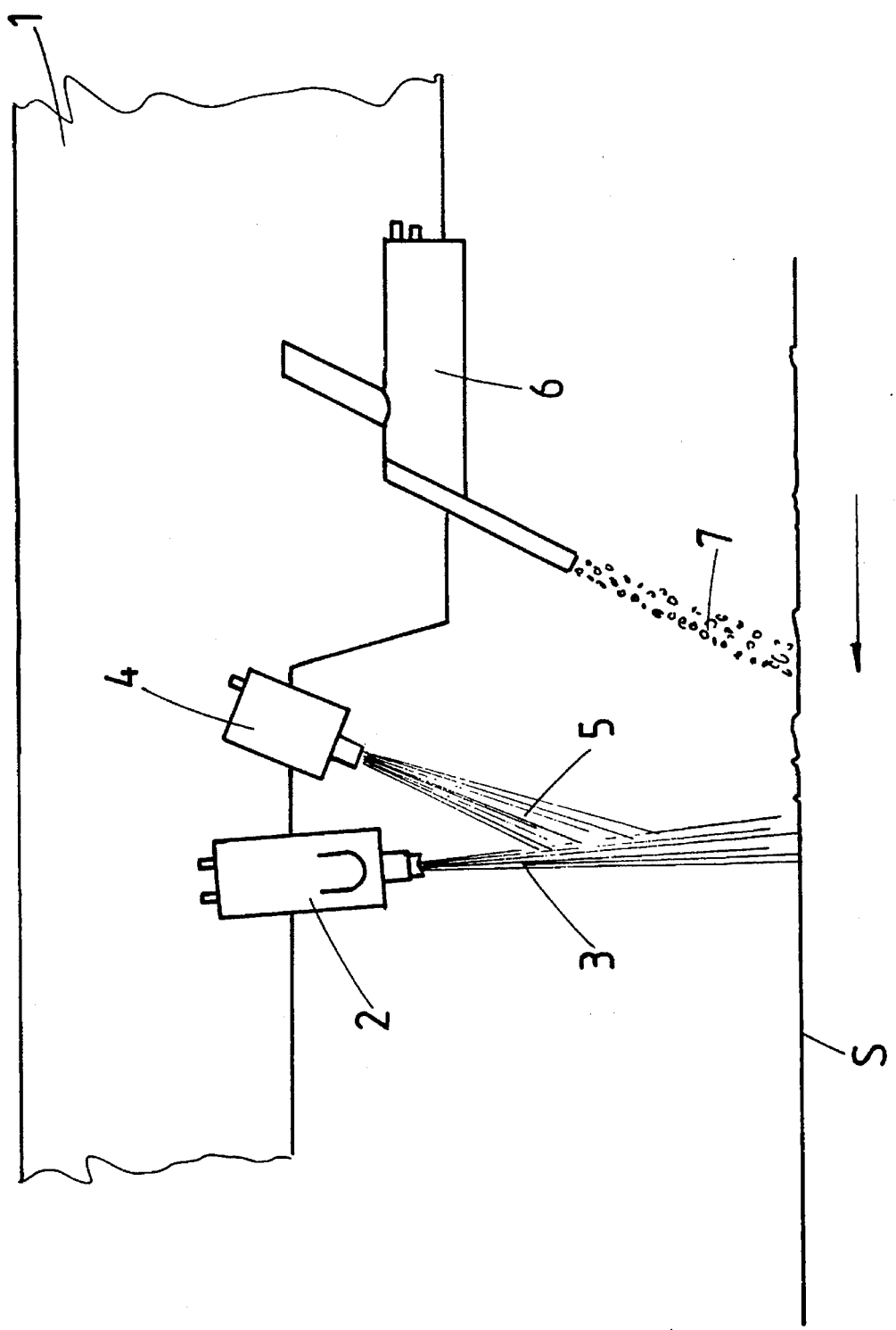
FIG. 2 shows a second example, in which the acid is sprayed directly into the jet of paint.

In a second embodiment, acid solution is applied, as shown in FIG. 2, simultaneously with the paint, by the acid 5 being sprayed into the spray mist of the paint 3, which comes from a spray gun 2, from a spray nozzle 4 which is installed directly following said spray gun 2. This achieves a homogeneous distribution of the acid in the coat of paint, and a homogeneous coagulation and thus solidification of the paint. Subsequently the bead scatterer 6 applies reflective beads 7 to the fresh marking.

In accordance with a third embodiment, the acid is used in the form of an acid-containing powder or of an acid-containing particulate material. For this purpose, for example, solid acid is mixed and ground with various commercially available fillers (e.g. silicates, sulphates, metal oxides) until the desired particle size and proportion are reached.

According to a preferred embodiment an acid-containing material is prepared as follows: water-soluble acid is dissolved in water, reflective beads in the form of glass beads are added to the solution, conventional fillers and/or binders are added if required, and the mixture is filtered and allowed to dry. In this way the glass beads are coated with acid. It is also possible to coat and to use other, so-called profiled particles; this combined application of paint and glass beads or other particles is carried out as described, for example, in EP-0 280 102. In this case the glass beads are used, on the one hand, for the rapid drying of the paint on application, and thereafter as reflection media on the road marking. The entire operation can be carried out by traversing the stretch to be worked on a single time, after which the mobile operations site is moved on.

Figure 3:
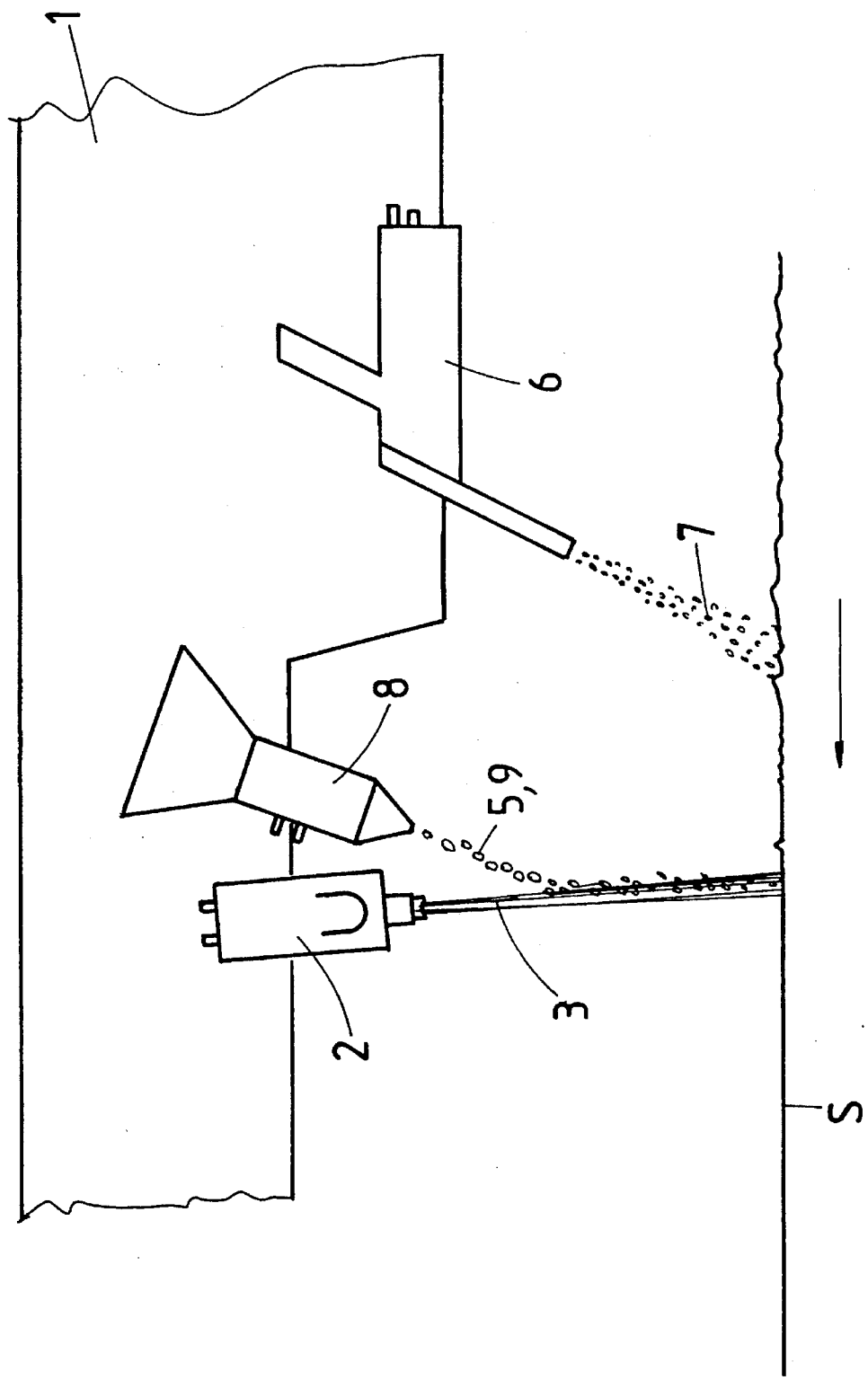
FIG. 3 shows a third example, in which a bead scatterer scatters reflective beads, which have been treated beforehand with acid, into the jet of paint.

The abovementioned embodiment of the method can be carried out using a marking vehicle 1 as shown in FIG. 3; in this case the paint spray gun 2 sprays a jet 3 of paint on to the road surface S, and a bead scatterer 8 scatters glass beads 9 into the jet 3 of paint emerging from the spray gun 2, the glass beads 9 having been treated beforehand, as described above, with an acid 5. Instead of treated reflective beads it is also possible to scatter other particles treated with acid, especially profiled particles, into the jet 3 of paint. In one variant of the method, the acid-treated reflective beads or other particles can also be scattered on to the freshly drawn road marking after the application of the paint to the road surface S. In addition, in the example according to FIG. 5, a rear bead scatterer 6 is also provided, for applying normal reflective beads 7 by scattering.

In relation to the known method, which is described in EP-B-0 280 102, the novel method according to the invention can be employed as follows, using, for example, a marking vehicle according to FIG. 4:

A marking vehicle 1 carries, following one another at short distances, a paint spray, gun 2, a particle dispenser 10, a nozzle 4, a second paint spray gun 12, a bead scatterer 6 and a second nozzle 13. The spray gun 2 sprays a jet 3 of paint on to the roadway surface S, following which the particle dispenser 10 applies profiled particles 11 to the marking; a short way behind this the nozzle 4 sprays acid 5 on to the fresh road marking, after which the profiled particles are covered with paint by means of the jet 3 of paint sprayed from the second paint spray gun 12; normal reflective beads 7 are then applied using the bead scatterer 6, and adhere in particular to the raised paint profiles produced by the profiled particles 11; finally, for the rapid drying of the film of paint ultimately applied, the nozzle 13 again sprays acid 5 on to the marking.

The method according to the invention can be carried out using commercially available, water-thinnable, acid-coagulable paint dispersions. The suitability of a particular dispersion for the method can be tested very easily: an acid is slowly added dropwise to the dispersion and, if the dispersion coagulates very quickly after a certain level of addition, it is suitable. Numerous acid-coagulable, water-thinnable dispersions or emulsions which can be used in accordance with the present method are described in EP-A-0 409 459. The pH of the formulations is adjusted to a pH of from 8 to 10 by means of known bases such as, for example, sodium hydroxide solution, ammonia and/or primary to tertiary organic amino bases, In contrast to EP-A-0 409 459, however, the use of volatile bases is not necessary according to the present invention. The solidification of the formulation (coagulation) occurs in general as it suddenly changes to a weakly acidic pH.

Most of the commercially available organic and inorganic, volatile or nonvolatile acids can be used in accordance with the present method in the form of an aqueous or, if possible, an organic solution, for example acetone. Examples are hydrochloric acid, sulphuric acid, phosphoric acid, nitric acid, acetic acid and citric acid.

Instead of acids it is also possible to use acid anhydrides, which react as acid on contact with the water of the aqueous emulsion paint. The use of appropriate anhydrides of inorganic acids, for example phosphorus pentoxide in solid form, or appropriate anhydrides of organic acids, in solid or liquid form, for example acetic anhydride dissolved in water or in an organic solvent such as acetone, have also given good results. When solid acid anhydrides are employed, they are preferably used in powder form and either scattered into the jet of paint from the spray gun or scattered on to the fresh paint marking, or alternatively used for coating reflective beads or profiled particles.

Aqueous acetic acid and citric acid have proved to be particularly advantageous, since acetic acid is volatile, environmentally friendly and inexpensive and because citric acid is odourless.

In the case of weak acids such as citric and acetic acid, a from 10 to 30 per cent strength, preferably an approximately 20 per cent strength, aqueous acid solution is used, whereas in the case of stronger acids such as hydrochloric or sulphuric acid a from 5 to 15 per cent strength solution, preferably an approximately 10 per cent strength solution is used. Relative to the methods which bring about solidification of the paint by addition of salts, the quantities of acid required are much lower. Depending on the nature and composition of the paint dispersion used, on the acid and the acid concentration and on the application method, an addition of dilute acid of from 0.6 to 2% by weight of the quantity of paint dispersion applied gives good results; in most cases about 1% by weight has been sufficient.

Numerous tests have been carried out, in particular with paint formulations which contain not only the conventional components, especially fillers and colour pigments, but also the three following commercially available dispersions as binders:

Joncryl (trade mark), sold by Johnson;

Luhydran (trade mark), sold by BASF;

Primal (trade mark), sold by Rohm and Haas.

The acids tested were citric acid, acetic acid, hydrochloric acid and sulphuric acid.

The tables in FIGS. 5 and 6 show test results for the three formulations indicated in column 1, in one case at a paint coat thickness of approximately 1000μ (FIG. 5) and in the other case at 400μ (FIG. 6). The test results relate on the one hand to laboratory experiments, in which the coat of paint was applied to a non-absorbent substrate in the form of a glass plate, and on the other hand to practical tests, in which the paint dispersions indicated were applied to a conventional bituminous road covering. In the laboratory tests the water content of the paint dispersions used was, as indicated, 45%, 27% and 18% respectively, and in the road tests it was 18%. The laboratory results obtained at the temperature and atmospheric humidity values indicated in columns 2 and 3 respectively are given in columns 4, 5, 6 and 7, the three minute indications which appear in each case, separated by oblique strokes, relating to the abovementioned water contents of 45%, 27% and 18% respectively, i.e. with the water content decreasing across the sequence.

The pH of the formulations used was adjusted to from 9 to 10 with the abovementioned bases. The results obtained with different acids were virtually identical and are therefore not listed individually. The data indicated relate, in the case of the tests with a paint coat thickness of 1000μ (FIG. 5), to 30 per cent strength aqueous citric acid, and to 20 per cent strength acetic acid for a paint coat thickness of 400μ (FIG. 6). The quantities measured in each case were the times after which the paint had dried and, respectively, had become water resistant, as indicated in columns 4 to 9 of the tables and expounded in more detail below.

The laboratory experiments were carried out in still air in a climatically controlled chamber. A drawing shoe was used to apply the paint dispersions to a glass plate in a defined coat thickness. Directly thereafter the film of paint was sprayed with acid solution and subsequently with acid until the paint coagulated. Drying was determined with a normal "thumb test", i.e. by applying the thumb with a slight rotation. If this did not damage the paint film, the paint was considered to be dry and thus capable of being driven over. After drying had been determined the paint film was held for 15 seconds in running water: when it was no longer washed off under these conditions it was regarded as being water resistant.

In the road tests, marking lines were drawn with a conventional paint spray gun. In the case of a paint coat thickness of 1000μ (FIG. 5) the acid solution was sprayed, using a marking vehicle according to FIG. 2, directly into the jet of paint coming from the paint spray pistol. In the case of a paint coat thickness of 400μ (FIG. 6) the acid solution was sprayed, using a marking vehicle according to FIG. 1, on to the fresh marking after the application of the paint. The drying times were determined as follows: a passenger car drove over the paint marking which had been put down. The paint was considered to be dry when there were no traces of paint to be seen on the tire of the car, or when there were no tire marks on the paint. The paint marking was regarded as water resistant if it did not become detached after 10 seconds under running water.

In the road tests, within the margins of error, approximately the same, short times indicated were obtained for all temperatures and all values of atmospheric humidity: at a paint coat thickness of 1000μ the drying time was 2 minutes or less and the "water resistance" time was 3 minutes or less. In the case of a paint coat thickness of 400μ (FIG. 6) the drying time was ¾ minutes or less and the "water resistance" time was 1.5 minutes or less. Even at other temperatures and atmospheric humidities, as indicated in FIG. 6, the changes in the drying times indicated were quite insignificant.

The quantity of aqueous acid solution used was about 1% by weight of the quantity of pain applied.

The tables of FIGS. 5 and 6 show that the drying times when acid is used are many times shorter than in the case of normal drying without acid. It is also evident that the drying times which were obtained in the open air, i.e. with air movement present virtually all the time, on a conventional more or less absorbent bitumen substrate are substantially shorter than the drying times obtained on a glass plate in a climatically controlled chamber without air movement. As is to be expected, the drying times using the same application technique but with a lower paint coat thickness are shorter than for a larger paint coat thickness. Also, the drying time decreases markedly as the water content of the paint falls. Finally, the tables show that the times for drying and for water resistance without the addition of acid depend fairly heavily on the atmospheric humidity and on the temperature, but are virtually independent of temperature and atmospheric humidity when acid is added.

As was shown, the method can be carried out in all of the abovementioned embodiments, if the coat of paint applied has a thickness of less than from 350μ to 450μ. At greater coat thicknesses it is advisable to apply the acid not only to the surface of the paint already applied, since otherwise there is a risk that a solid surface skin will form with the paint remaining liquid underneath, but instead to apply the acid or the acid-containing material simultaneously with the paint, for example in the form of a spray mist.

In practice a further procedure is first to apply the paint and, optionally, the glass beads with a conventional marking vehicle while applying the acid by spraying from a safeguarding vehicle which directly follows the marking vehicle, such a safeguarding vehicle normally being used in mobile operations sites and carrying warning and direction signs for the traffic behind.

The invention therefore provides a cost-effective method for bringing a road marking rapidly to a state where it can be driven over. The method can be-employed on any mobile operations site, on parking areas, on airport runways, etc., and in general on any civil engineering construction site where there is a need to work very quickly. Another feature worthy of note is the environmental compatibility of the method: since coagulation occurs even at a weakly acidic pH and the acid applied is neutralized, virtually no acid passes on to the road and into the environment. In addition, if a nonvolatile acid, for example citric acid, is used, this method is also absolutely odourless.

The method according to the invention can be employed in the manner described to all aqueous paint formulations which are based on an acid-coagulable binder.

I claim:

1. Methods of applying horizontal markings to roads or other traffic areas, which comprises;

applying to the area an aqueous, water-thinnable, acid-coagulable emulsion paint; and contacting the applied paint with an acid.

2. Method according to claim 1, wherein an emulsion paint is used which has been formulated to the basic and which contains an acid-coagulable binder.

3. Method according to claim 1, wherein the acid is sprayed on to the applied emulsion paint.

4. Method according to claim 1, wherein the emulsion paint is sprayed on to the area and the acid is sprayed into a spray mist of the paint during application.

5. Method according to claim 1, wherein an acid anhydride is added to the emulsion paint and forms acid.

6. Method according to claim 5, wherein the acid anhydride is selected from the group consisting of anhydrides of inorganic acids and anhydrides of organic acids.

7. Method according to claim 1, wherein the acid is in the form of solid, acid-containing or anhydride-containing particles which are scattered on to the applied emulsion paint.

8. Method according to claim 7, wherein the acid-containing particles are composed of glass beads which are coated with a thin, adhering layer of solid acid or solid acid anhydride.

9. Method according to claim 1, wherein the emulsion paint is sprayed on to the area and the acid is in the form of solid, acid-containing or anhydride-containing particles which are sprayed into a spray mist of the paint.

10. Method according to one of claims 1, wherein the acids used are commercially available.

11. The method of claim 1 wherein the acid is selected from the group consisting of a 10 to 30 percent aqueous solution of a weak acid and a 5 to 15 percent aqueous solution of a strong acid.

12. The method of claim 1 wherein the quantity of acid is 0.6 to 2.0 percent by weight of the paint.

13. Apparatus for applying a horizontal marking to a road or other traffic area, which comprises;

a vehicle (1);

a spray gun mounted on the vehicle, in a position to spray marks on the area; and means for applying an acid to the spray marks, mounted on the vehicle.

14. Apparatus according to claim 13, wherein the vehicle (1) carries behind the spray gun (2) a dispenser (10) for profiled particles (11), followed by a reflective-bead scatterer.

* * * * *